(12) United States Patent
Pardikar et al.

(10) Patent No.: US 7,089,284 B2
(45) Date of Patent: Aug. 8, 2006

(54) METHOD AND SYSTEM FOR CLIENT-SIDE CACHING

(75) Inventors: Shishir Pardikar, Redmond, WA (US); Joseph L. Linn, Issaquah, WA (US); Balan Sethu Raman, Redmond, WA (US); Robert E. Corrington, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/880,056

(22) Filed: Jun. 28, 2004

(65) Prior Publication Data

US 2004/0236777 A1 Nov. 25, 2004

Related U.S. Application Data

(63) Continuation of application No. 09/134,720, filed on Aug. 14, 1998, now Pat. No. 6,757,705.

(51) Int. Cl.
*G06F 12/08* (2006.01)
*G06F 12/00* (2006.01)

(52) U.S. Cl. .................. 709/203; 711/118; 711/137
(58) Field of Classification Search .................... None
See application file for complete search history.

(56) References Cited

U.S. PATENT DOCUMENTS

| | | | | |
|---|---|---|---|---|
| 5,564,037 A | 10/1996 | Lam | ............................ | 711/161 |
| 5,649,099 A | 7/1997 | Theimer et al. | ............ | 713/201 |
| 5,721,916 A | 2/1998 | Pardikar | ...................... | 707/201 |
| 5,740,432 A * | 4/1998 | Mastors | ....................... | 707/202 |
| 5,758,342 A * | 5/1998 | Gregerson | .................... | 707/10 |
| 5,878,213 A | 3/1999 | Bittinger et al. | ............. | 709/203 |
| 5,881,229 A | 3/1999 | Singh et al. | .................. | 709/203 |
| 5,924,116 A | 7/1999 | Aggarwal et al. | ........... | 711/122 |
| 5,937,421 A | 8/1999 | Petrov et al. | ................ | 707/526 |
| 6,035,324 A | 3/2000 | Chang et al. | ................ | 709/203 |
| 6,085,234 A * | 7/2000 | Pitts et al. | ................... | 709/217 |

OTHER PUBLICATIONS

Condry, M. et al., "The Object-Oriented Advantage in Prototyping a Remote File System", Proceedings of the Second International Workshop on Object Orientation in Operating Systems, 1992; pp. 190-199.
Preston Gralla, "How the Internet Works Fourth Edition", Que Corporation, Sep. 1998; pp. 170-171.
Slackware LINUX Installation & Getting Started, Walnut Creek CDROM books, Nov. 1996; pp. 125-129.

* cited by examiner

*Primary Examiner*—B. James Peikari
(74) *Attorney, Agent, or Firm*—Law Offices of Albert S. Michalik, PLLC

(57) ABSTRACT

An improved method and system for client-side caching that transparently caches suitable network files for offline use. A cache mechanism in a network redirector transparently intercepts requests to access server files, and if the requested file is locally cached, satisfies the request from the cache when possible. Otherwise the cache mechanism creates a local cache file and satisfies the request from the server, and also fills in a sparse cached file as reads for data in ranges that are missing in the cached file are requested and received from the server. A background process also fills in local files that are sparse, using the existing handle of already open server files, or opening, reading from and closing other server files. Security is also provided by maintaining security information received from the server for files that are in the cache, and using that security information to determine access to the file when offline.

7 Claims, 10 Drawing Sheets

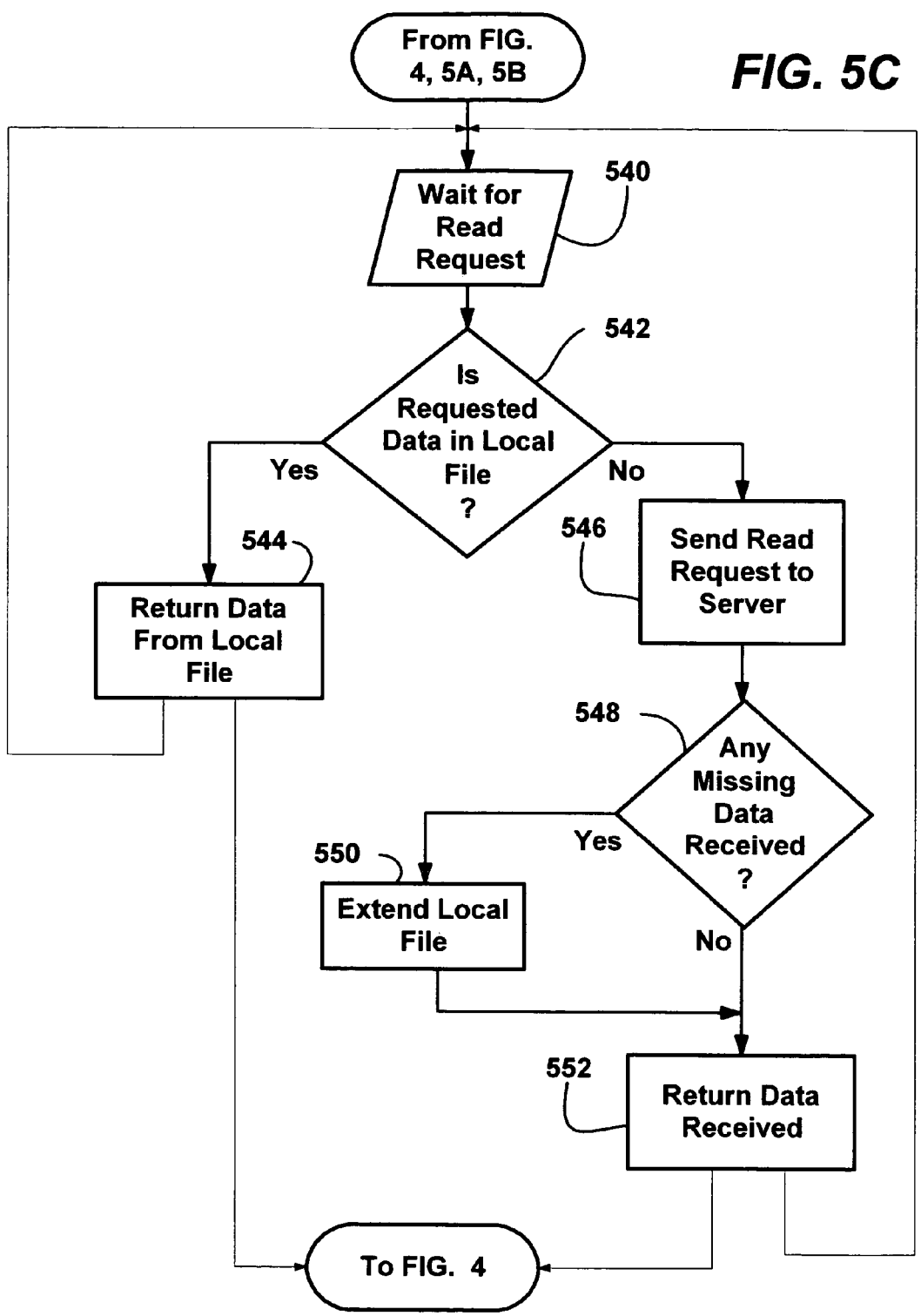

| UNC | Redirected | Changed? | |
|---|---|---|---|
| \\ABC\def | F:\ | 1 | |
| \\Products1\Rel | H:\ | 0 | |
| \\Scratch\Docs | T:\ | 1 | |
| ⋮ | ⋮ | ⋮ | ⋮ |
| \\Corporate\files | H:\ | 0 | |
| \\http:site\lnk | F:\ | 0 | |

Superroot Table

*FIG. 7*

METHOD AND SYSTEM FOR CLIENT-SIDE CACHING

CROSS REFERENCE TO RELATED APPLICATION

This application is a continuation of U.S. patent application Ser. No. 09/134,720, filed Aug. 14, 1998, now U.S. Pat. No. 6,757,705.

FIELD OF THE INVENTION

The invention relates generally to computer systems, and more particularly to an improved method and system for caching network files on a client computer system.

BACKGROUND OF THE INVENTION

The caching of network information on a local computer has two main advantages, a first being the ability to access the information when the local computer is disconnected from the network, and a second being a reduction in the amount of data transmitted on the network server to the client. The benefit to having network information available when disconnected is readily apparent, i.e., network users may work on files when disconnected from the network, such as when traveling, working at home, or at times when the network is down. This is highly important, as more and more corporations require that company data be stored on the network, and at the same time require their employees to be more mobile and be able to continue working even when fully disconnected from the corporate network. Benefits to reducing the amount of transmitted data include a reduction in the server workload, a reduction in the client's perceived latency, and an increase in available network bandwidth.

U.S. Pat. No. 5,721,916, assigned to the assignee of the present invention and hereby incorporated by reference in its entirety, describes a caching (shadowing) method and system that was designed to operate on multiple types of networks. While this shadowing method and system provide the above-described advantages of offline access and reduced communication, certain drawbacks are inherent therewith. One drawback is that the system architecture is complex and inefficient, primarily resulting from the supporting of multiple network types. For example, the caching mechanism of the shadowing system and method is located separately from the network redirectors, whereby the redirector needs to exchange a lot of information with the caching mechanism to properly cache the files. Another drawback was in the area of security, for example, those with access to the disconnected client machine had access to the cached data. Lastly, other improvements, enhancements and optimizations to existing client-side caching are generally needed.

SUMMARY OF THE INVENTION

Briefly, the present invention provides a system and method for improved client-side caching that transparently caches suitable network files for offline use. A cache mechanism in a network redirector transparently intercepts requests to access server files, and if the requested file is locally cached, satisfies the request from the cache when possible. For files existing locally, local and remote timestamps may be compared to ensure that the local file is current. Otherwise the cache mechanism creates a local cache file and satisfies the request from the server, and also fills in sparse cached files as reads for data in ranges that are missing in the cached file are requested and received from the server. The cache mechanism also sends write requests to both files to keep the files concurrent and extend them as necessary. A background process further fills in local files that are sparse, using the existing handle of already open server files, or opening, reading from and closing other server files. Security is also provided by maintaining security information received from the server for files that are in the cache, and using that security information to determine access to the file when offline.

Other advantages will become apparent from the following detailed description when taken in conjunction with the drawings, in which:

BRIEF DESCRIPTION OF THE DRAWINGS

FIG. 5C is a flow diagram generally representing the steps taken to process a read request in accordance with aspects of the present invention; and FIGS. 6–8 are block diagrams representing information included in a cache database in accordance with aspects of the present invention.

DETAILED DESCRIPTION OF THE PREFERRED EMBODIMENT

Exemplary Operating Environment

Figure 1:
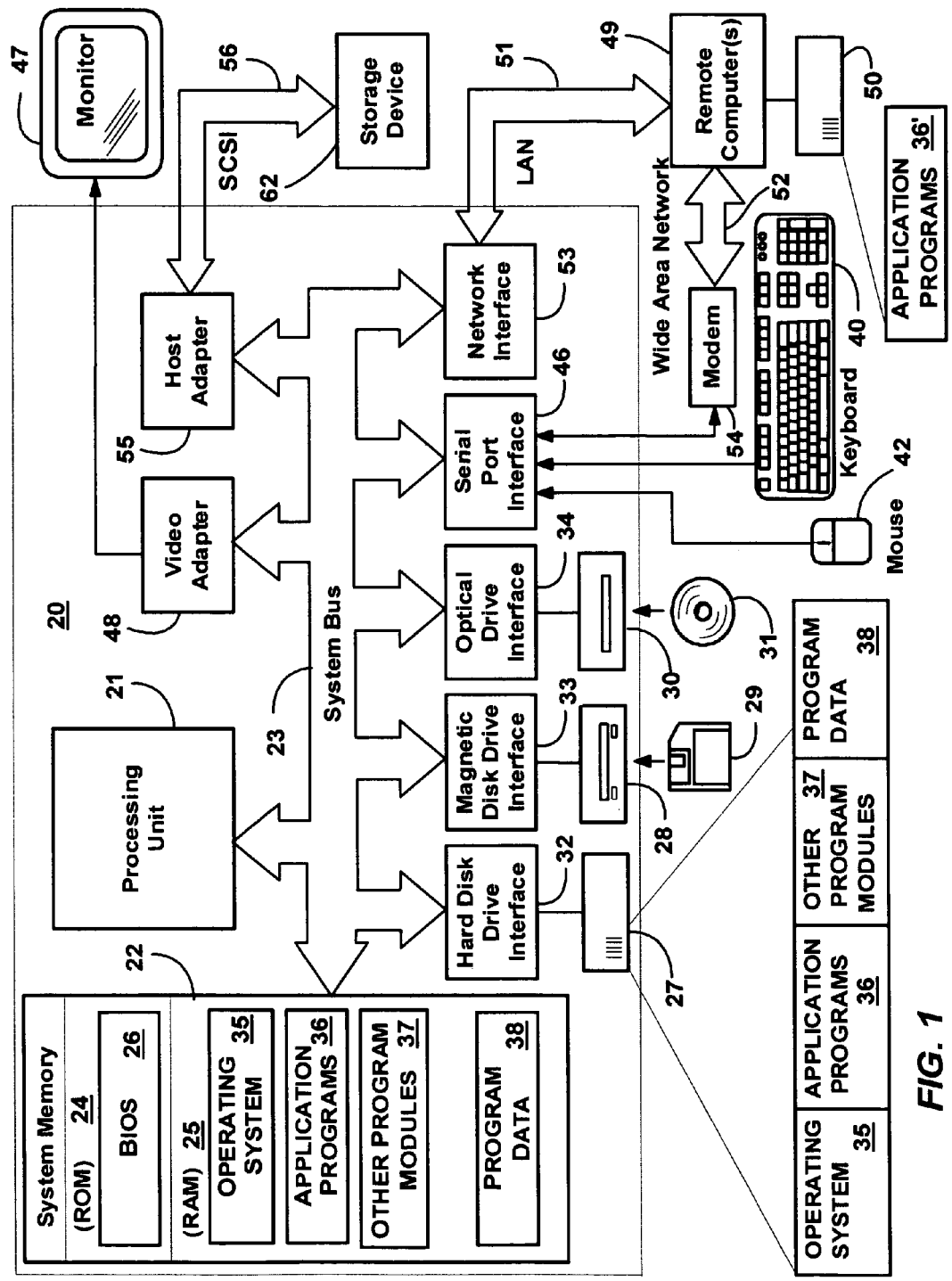
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. For purposes of the description below, the computer system 20 may serve as the client machine, while one of the remote computers 49 may serve as a file server having files accessed by the client machine.

Client-Side Caching

In general, the present invention provides a method and system for improved client-side caching that transparently caches suitable network files for offline use and the like. The present invention is described within a Microsoft® Windows NT® architecture, however it is understood that the invention may be implemented in other architectures and/or operating systems.

Figure 2:
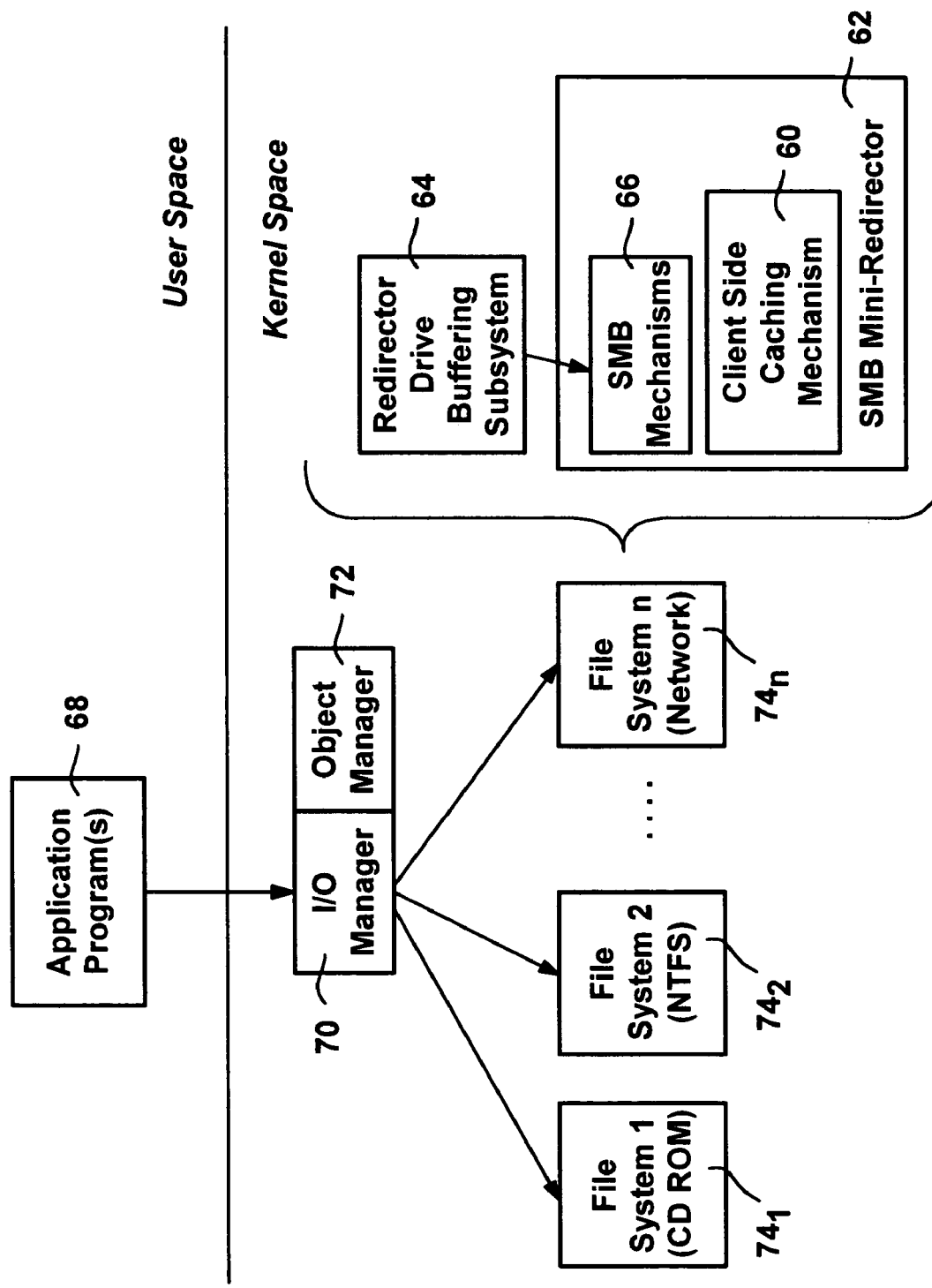
FIGS. 2 and 3 are block diagrams representing various components for implementing client-side caching in accordance with one aspect of the present invention.

As shown in FIG. 2, a caching mechanism 60 is maintained at a network redirector 62 level, preferably within the redirector 62. As is known, a redirector basically provides the illusion of a local file system drive, when in actuality the file system physically resides on another computer connected to the network, by handling (among other operations) the mapping of local references to universal naming convention (UNC) references. Since the caching mechanism 60 is at the redirector 62 level, the caching mechanism 60 is made aware of communications over the network, and can intercept and/or act on those communications as described below. Although not necessary to the present invention, in a preferred, tiered architecture, various functions of the redirector have been distributed to a redirector drive buffering subsystem 64 and an appropriate network-specific (e.g., Server Message Block or SMB type network) "mini"-redirector 66. Since these components are not directly related to the caching operations of the present invention, for purposes of simplicity they will not be described hereinafter.

When an application 68 requests a file open operation, e.g., via an appropriate application programming interface call, an I/O Manager 70 receives the request, and, in combination with an Object Manager 72, determines an appropriate file system $74_1$–$74_n$ corresponding to the requested file and handles the request. Note that the correct file system is known to the Object Manager 72, since during boot-up, each of the file systems registered their information with the system registry, (e.g., the redirector is the provider of UNC namespace). Essentially, the I/O Manager 70 creates a uniform view to the application 68 of the various file systems $74_1$–$74_n$.

If the requested file is a network file, the redirector 62 ultimately receives the request from the I/O Manager 70, and, assuming at present that the requested file is not already cached, the redirector causes the request to be passed to the network server 49 where the file is opened or an error occurs. If no error occurred, a handle to the remote file is returned to redirector 62, along with other file metadata, including a timestamp, the maximum access rights of the requested user, access rights (if any) for guests, and client side caching policy settings. The client-side policy settings, described below, are bit values or other values indicative of whether the network file may be locally cached, and if so, how the file may be cached, e.g., automatically or manually. For purposes of efficiency, the settings may be associated with the network shared folder and the files of that shared folder treated the same way.

Figure 3:
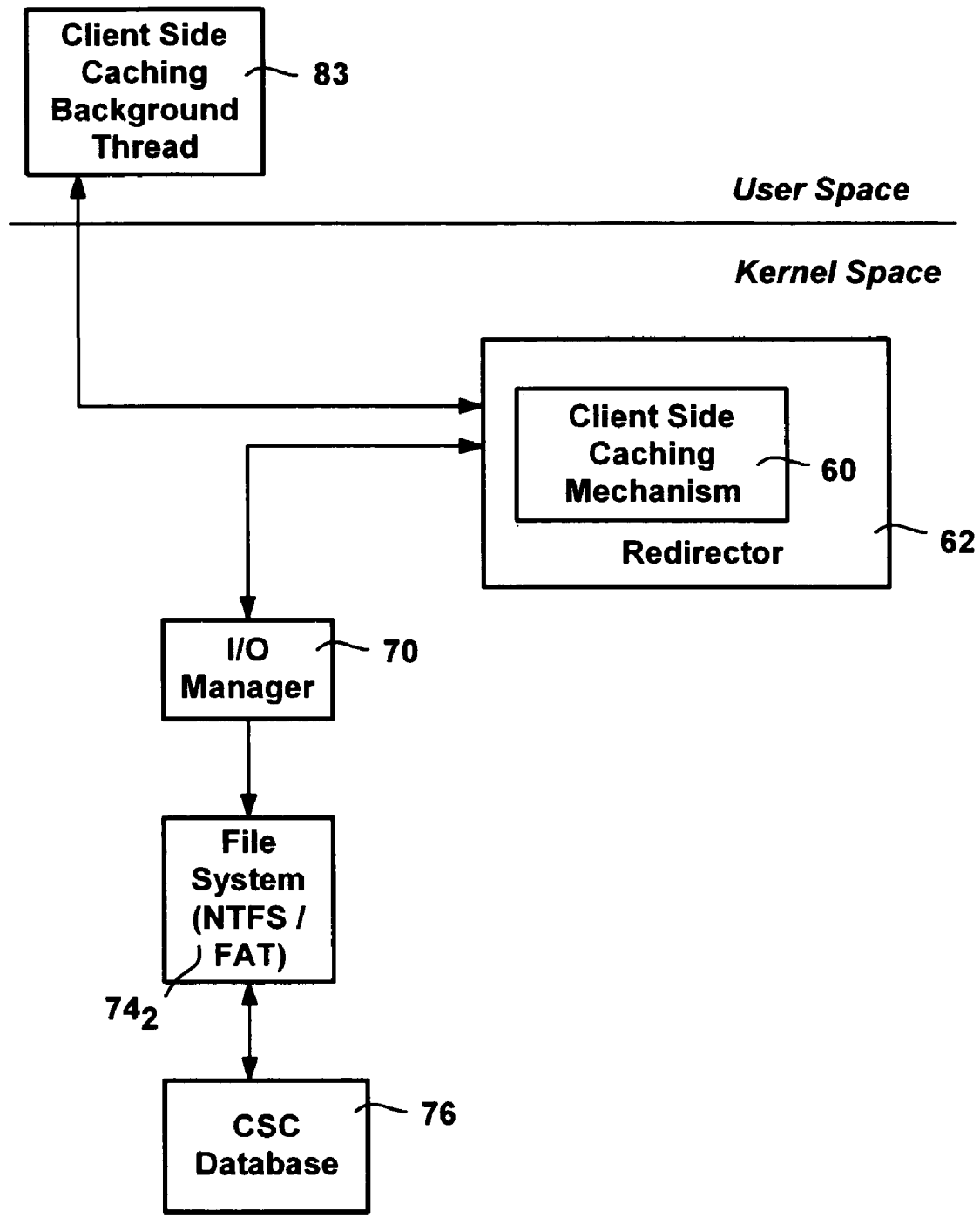
Figure 6:
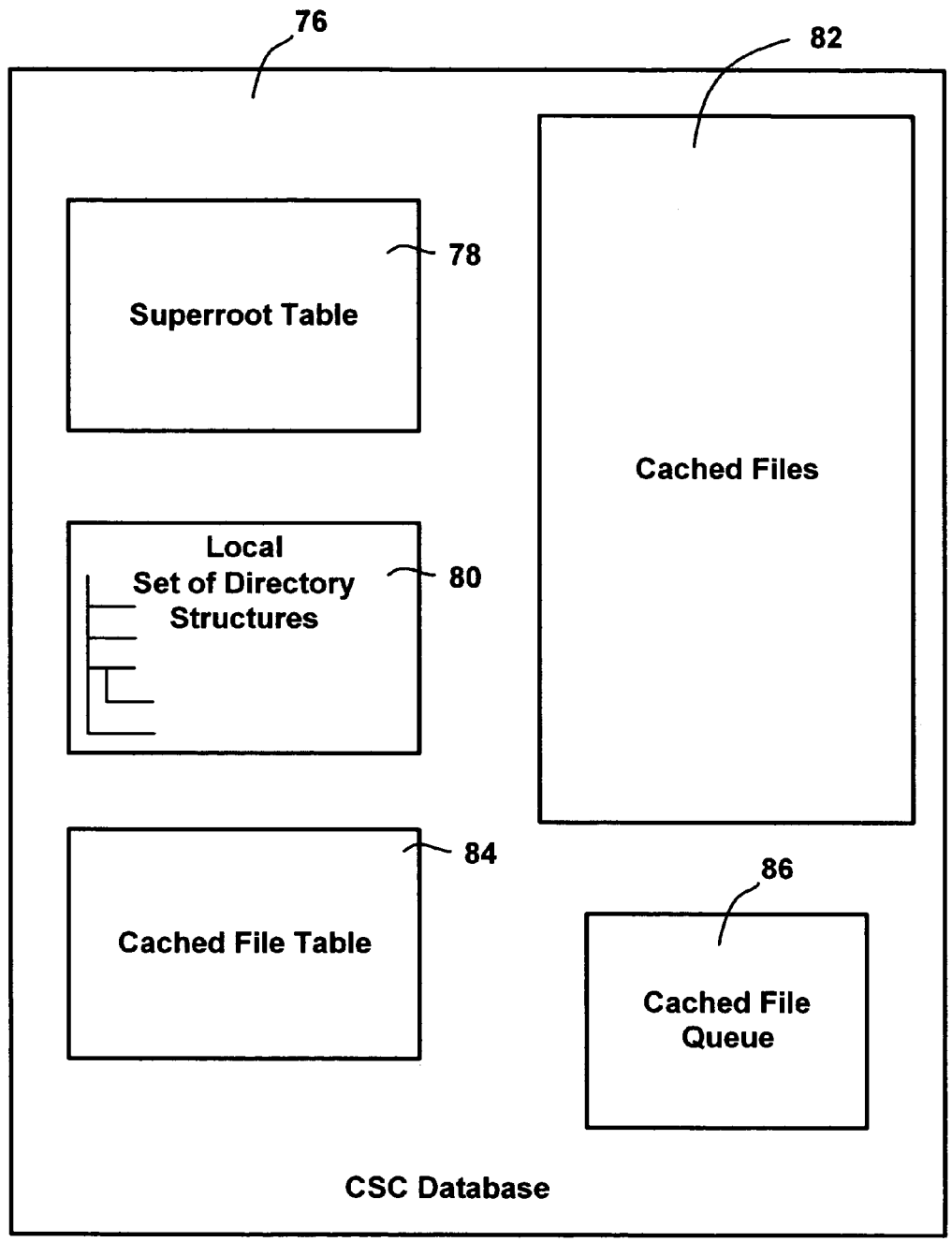

If the requested file is cacheable, the client-side caching mechanism 60 stores file-related information in a database 76 (FIG. 3), and creates the file in the cache 82 (FIG. 6), otherwise the caching mechanism 60 simply returns the server-file handle to the application. The database 76 is preferably an NTFS (Windows NT® file system) file object for purposes of security. The file-related information includes the UNC information, stored in a "superroot" table 78 (FIG. 7) of the database 76. Additionally, the client-side caching mechanism 60 recreates and persists the precise hierarchical network path information for that file in a local set of directory structures 80, whereby the local path is the same as the network path. Note that unlike other programs that place files into their own directories, storing the local set of directory structures enables the precise online path and filename to be recreated by the caching mechanism 60 when offline, which provides advantages.

One advantage is that the file name is truly transparent to the user, as the user has a view of the file that is the same whether online or offline. A related advantage is that applications also see the same pathname. By way of example, a word processing program may maintain a list of the most recently used documents. If a user accesses a file (e.g., X:\dir1\dir2\file3.doc) from the network server 49, the file is entered into the application's most recently used list. If the user is later offline and clicks on one of these files to open it, the precise path will be recreated by the caching mechanism 60, whereby the cached copy of the file may be found. Note that other programs which copy network files into their own directories, e.g., c:\syncpgm\dir1\dir2\file3.doc do not provide a way in which the application program may locate the offline copy. In this manner, the user of the application 68 receives the same experiences whether online or offline. Indeed, if the server goes down or the connection is otherwise lost while the user is working on a cached file, the user will not necessarily notice the change, except to possibly detect a performance improvement since changes will not be written to the server copy, or unless some other notification mechanism informs the user. Of course, the number of files available to the user will also likely change, since network files that are not fully cached are no longer displayed to the offline user.

Once the file is opened, it may be read by the application, and at the same time, may be read into the local cache 82. However, as with typical read requests, the entire file is not ordinarily read at once, (unless the file is small), but rather only a specified range of the file is read at any one time. Thus, following the first read, the cached file may be sparse. The file is filled in via two mechanisms. A first mechanism is present in the caching mechanism 60 and checks the read request of the application against the data, if any, in the cached file. If the cached data in the sparse file satisfies the read request, the cached data is used, while if not, a read request is sent to the server. Then, in addition to returning the requested read data to the application, the caching mechanism 60 fills in the sparse file with the read data returned. Note that part of the requested read data may be cached, whereby the caching mechanism 60 may send a request for partial data and recombine the partial request's result with the cached data into a full result. For example, if the application requests bytes 10,000 to 30,000 (numbers are decimal) and bytes 10,000 to 20,000 are already cached, then the caching mechanism 60 need only request bytes 20,001 to 30,000 to have enough information to receive the request. Reads are described in more detail below with reference to FIG. 5C.

Figure 4:
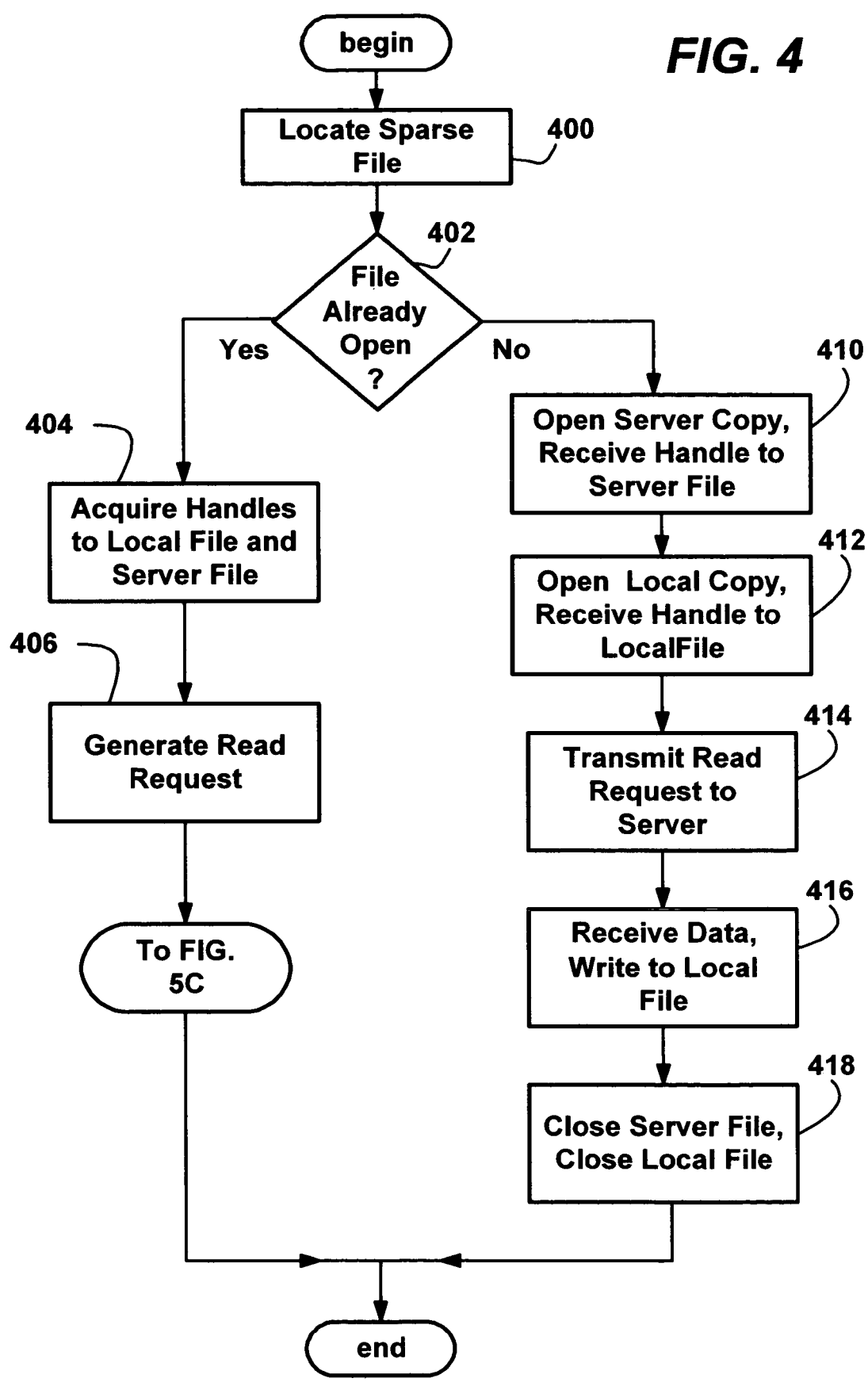
FIG. 4 is a flow diagram generally representing the steps taken by a background process to read data into sparse files for local caching in accordance with another aspect of the present invention.

A second way in which sparse files are filled in with data is shown in FIG. 4. The steps of FIG. 4 are preferably implemented by a background thread 83 (FIG. 3), i.e., a daemon process, or agent as referred to in the aforementioned U.S. Pat. No. 5,721,916. The background thread 83 occasionally wakes up, and via control calls to the redirector, finds a sparse file (if any) in the database according to some order, and then fills a missing part of that file with data from the server file. For purposes of simplicity, FIG. 4 assumes no errors occur, however, as can be readily appreciated, such errors may be handled via standard error-handling techniques.

In accordance with one aspect of the present invention, after locating the file (step 400), the background thread 83 checks at step 402 to see if the file is already open. If so, the process branches to step 404 wherein the existing file handles (local and remote) are obtained from the caching mechanism 60. The use of the existing file handle is significant, as errors and the like otherwise may occur, such as if the thread 83 was reading the file via one handle while a write to the file via another handle were pending, and so on. By using the same handle, such possibly conflicting operations may be properly queued, thereby keeping the correct ordering of the operations. Thus, at step 406, a read request is appropriately generated (such as based on the current file length and/or by keeping a read pointer associated therewith), to read server data and possibly extend the file, as conceptually represented in FIG. 5C and described below.

If the file was not open, then steps 410–418 are executed, in general to open the remote and the local files, transmit an appropriate read request to the server via the server file handle, receive and write the data to the local file, and then close the file handles. The process 83 may use the local file length and/or maintain a read pointer to request a range of data as desired to extend the file.

Figure 5A:
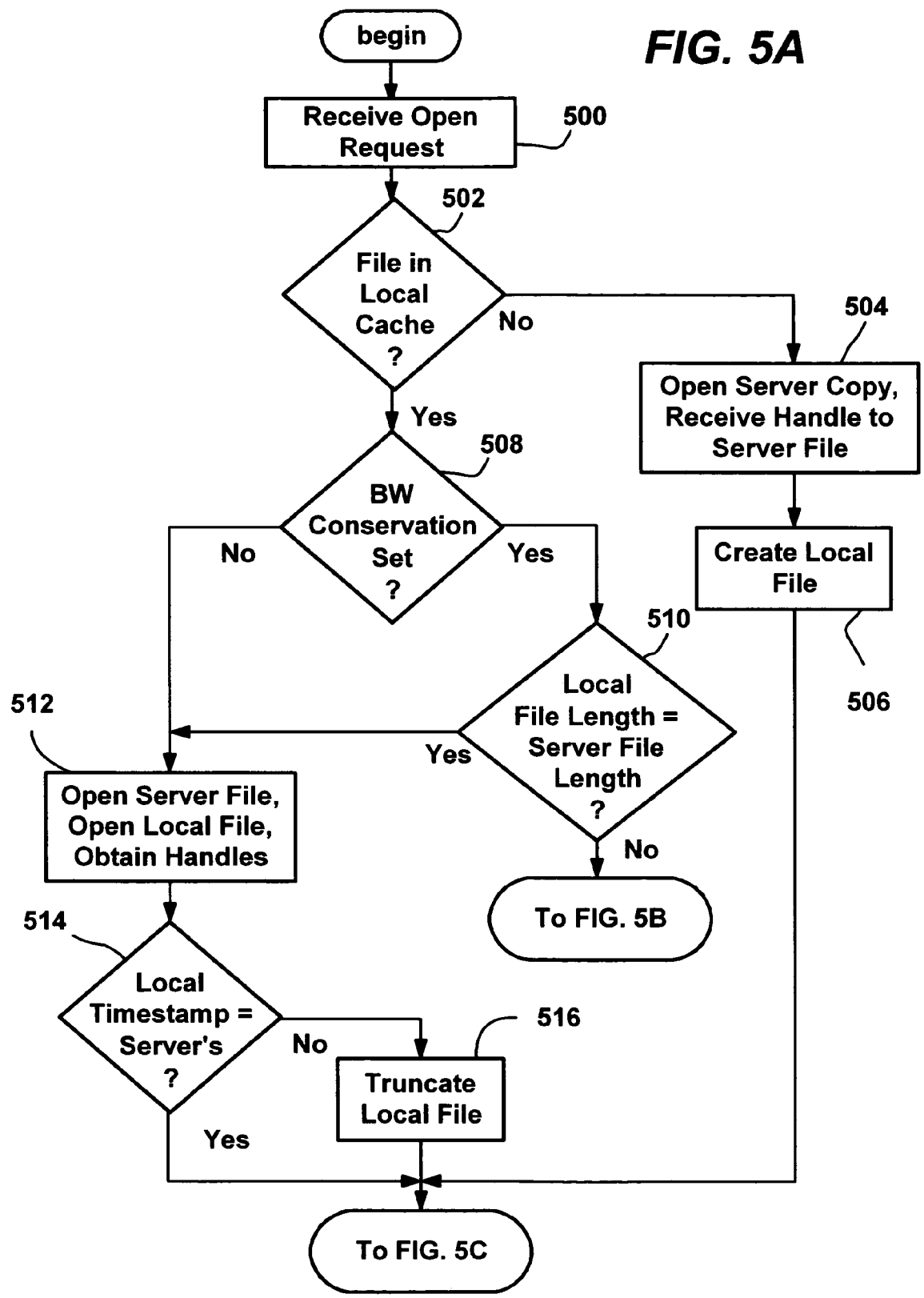
FIGS. 5A–5B comprise a flow diagram generally representing the steps taken to process a file open request in accordance with aspects of the present invention.

FIG. 5A illustrates the general steps taken by the caching mechanism 60 when the redirector 62 receives a file open request from the I/O Manager 70 while the computer system 20 is online, beginning at step 500. Note that when offline, the system 20 operates using the cached file if found, and if not found, returns an appropriate error. Moreover, note that the steps of FIGS. 4 and 5A–5C are simplified in that errors are not considered, e.g., file not found errors, no connection to server, and so on. However, those skilled in the art can readily appreciate that such errors are essentially handled using standard error-handling techniques, e.g., return a file not found error and display a dialog when a file is not found. Step 502 looks to see if the requested file is in the cache. Both complete and sparse (incomplete) files may be maintained in the local cache 82 as described below, and although the cache 82 is shown within the database 76, there is no requirement that the cache be located therein. There are many reasons why a file is not in the cache 82, including that the file was never accessed before, the file was pushed out of the cache 82 by a size quota, or the file was not cacheable according to its policy settings as generally described above.

In any event, if the requested file is not in the cache at step 502, step 502 branches to step 504 to open the server copy and receive the file handle thereto, and step 506 creates the local file. The open process is then accomplished, and the cache mechanism then awaits further requests related to this file, such as conceptually represented by awaiting a read request as shown in FIG. 5C.

If the file is in the local cache, then step 502 branches to step 508 wherein a test is performed by checking designated bits of information to see if the server is in a bandwidth conservation mode. In general, when in the bandwidth conservation mode, the server file is opened only if necessary. If in the bandwidth conservation mode, step 508 branches to step 510 to determine if the local file copy has the same length as the server file copy, i.e., the local file copy is not sparse. If the local file is sparse, then step 510 branches to step 520 of FIG. 5B, described below, else step 504 branches to step 512 wherein the local and server files are opened and the respective file handles obtained. Note that it is generally necessary to open the server file when the local file is incomplete, and thus bandwidth may not be conserved by opening only the local file.

Once the handles are obtained, step 514 is next executed to compare the timestamps of the files to determine if the server file and the local file are the same. As can be appreciated, the file may have been changed on the server since the file was last written to the cache 82, and if so, a timestamp difference will exist. Note that instead of timestamps, the server may use checksums, version numbers, strong entity tags and so on to accomplish the same thing. Thus, if not the same, the local file data is stale, whereby at step 516 the local file is truncated, i.e., its data is essentially cleared. Note that the steps of FIGS. 5A–5B do not address the issue of a timestamp being different because the user modified the file offline. However, as described below, synchronization between offline changes and the server is performed at logon to avoid this problem, and moreover, a simple test may be performed (on a modified file indicator maintained as metadata with the file, described below) to ensure that any offline changes are not inadvertently overwritten. At this time, the open process is complete, whereby the cache mechanism awaits further requests related to this file, such as conceptually represented by awaiting a read request as shown in FIG. 5C, described below.

Figure 5B:
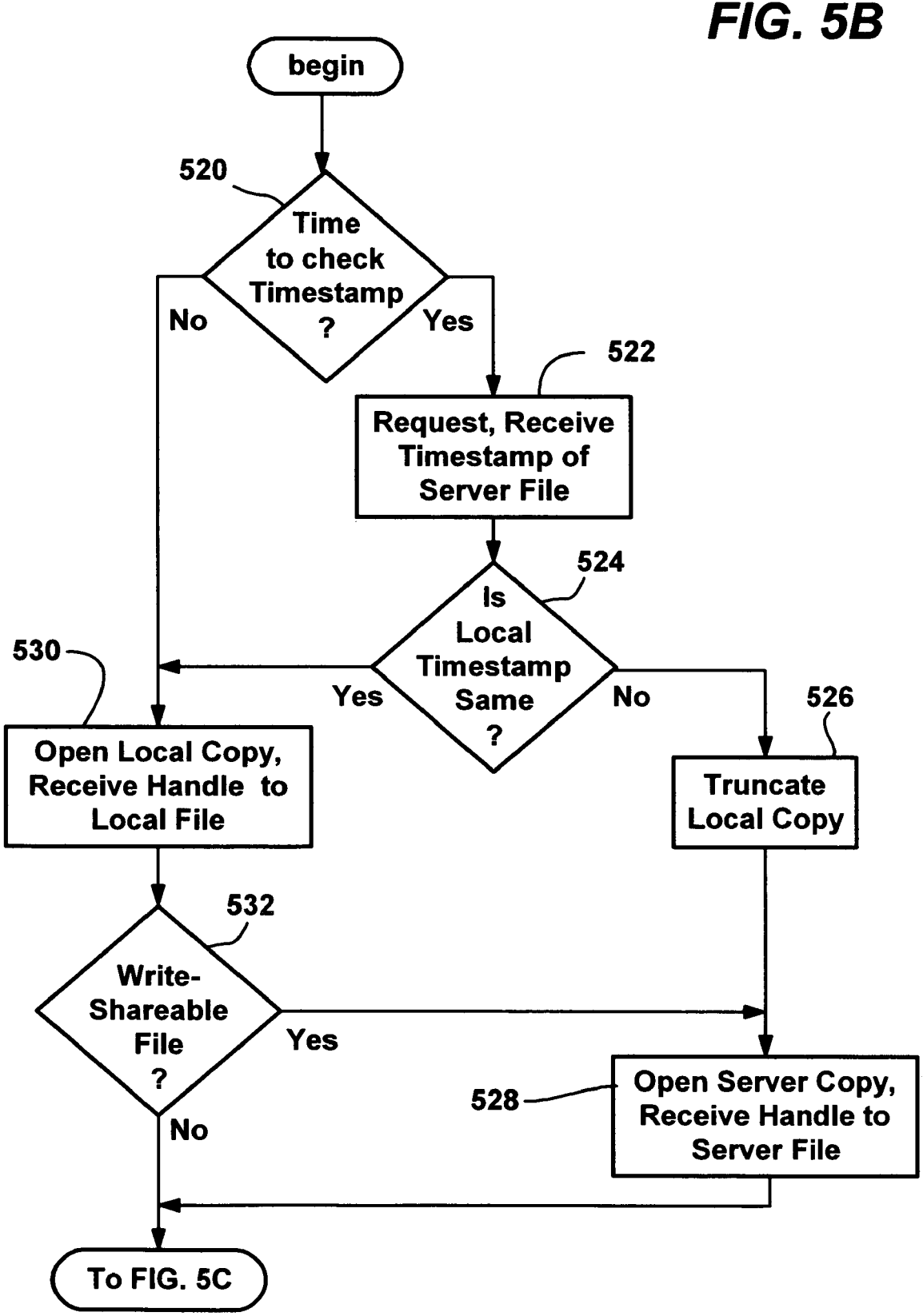

As represented in FIG. 5B, in the bandwidth conservation mode, step 520 is executed which examines system policy to determine whether to check a timestamp of the locally cached file against the timestamp of the remote file on the server. According to policy settings, the timestamp is not necessarily checked every time, i.e., a policy may be set that may skip the timestamp comparison according to some criteria. For example, the policy may be set so as to only check each file once per day (unless specifically reset) instead of checking every time. Similarly, so as to not defeat the primary purpose of caching, when the machine is offline, the timestamp comparison (which cannot be performed when offline) will not be performed. If the timestamp need not be checked, step 520 branches to step 530 to open the local copy from the cache 82 and thereby receive the local file handle thereto.

However, if the timestamp needs to be checked, (and, of course, the system is thus online), step 520 branches to step 522 to request and receive the server's timestamp corresponding to this file. Once the timestamp is received, (again, assuming no errors), step 522 continues to step 524 to make the comparison against the local file's timestamp, i.e., the timestamp received from the server when the file was cached. If the local timestamp is the same as the timestamp returned from the server, then the cached file is up-to-date, and thus step 524 branches to step 530 to open the file as described above. Alternatively, if the timestamps are not the same, step 524 branches to step 526 where the stale cached copy is truncated or otherwise marked as stale. Step 526 then continues to step 528 to open the server copy as described above.

In accordance with one aspect of the present invention, if at step 530 the complete local copy was opened, (and the client is online), then the corresponding server file may or may not be opened at the same time, primarily depending on the type of file opened. In general, the server file is opened (sometimes referred to as "flowing the opens") and a handle to that file obtained so that modifications to the local copy are also written to the server copy, keeping the files consistent. In other words, write operations while online comprise two separate writes, one to the cached file and one to the server file, in order to keep the files coherent and extend the files as needed.

However, the present invention takes advantage of the fact that not all files may be written, while other files are not ordinarily shared. By way of example, some files such as CD-ROM files are always read-only, while others are read only to most users, such as executable program files. When such files are in the cache and opened, there is no reason to open the server copy for writing purposes. Similarly, some files can be written to, but are not intended to be shared with other users. If only one user will make changes to a file, that file need not be opened for simultaneous writing thereto, but instead may be sent to the server 49 at a later time when all offline changes are complete. Step 532 checks certain policy properties stored with the cached file which indicate whether the server copy needs to be opened when the cached copy is opened. If so, step 532 branches to step 528 to open the server file and receive the handle for performing writes thereto to keep the local and server files coherent and extend the files as necessary. As can be readily appreciated, not having to always open the server copy provides a significant increase in network and file server performance when considered in the context of many network users concurrently accessing many files.

Four policy settings (two metadata bits) presently are associated with each server file (per folder for efficiency), a manual setting, an automatic-for-documents setting, an automatic-for-programs/read-only/not-shared-files setting and a no-caching setting. These properties are maintained with the cached file in a cached file table 84, described below (of course "no caching" will prevent such files from being cached). Manual indicates that the user needs to directly request caching of the file as described below. The automatic settings are also described below, with the difference being that automatic for documents causes the server copy to be opened at step 428 while the other automatic setting does not.

In accordance with another aspect of the present invention, a user may "pin" a file (to which proper access and caching is allowed) causing that file to be locally cached. In general, the user does this when specifically requesting a file for offline use, typically by selecting a file (such as via the Windows Explorer tool) and clicking a "pin" option. Files which are pinned are not subject to any cache quota, and thus must be specifically removed from the cache by the user. Other, unpinned files may be automatically removed from the cache 82 to enforce cache size limitations. To this end, each time a file is accessed, the file (i.e., an identifier thereof) moves to the top of a cached file queue 86. Unpinned files are removed from the cache 86 starting with those identified at the bottom of the queue. In this manner, disregarding pinned files, the least-recently accessed files are the first to be removed.

For a sparse file that is already opened (e.g., by an application), the caching mechanism and the background thread generally implement the steps of FIG. 5C to extend the file. Step 540 conceptually represents the caching mechanism awaiting a read request made by the application for the specified file, although as can be readily appreciated, in actuality the caching mechanism awaits many types of possible operations for possibly many files. Note that the background thread 83 generates its own read request as described above and thus does not wait for another entity to request the read. In any event, once a read request is present, step 542 is executed to look and see if the requested range of data is already in the local file. If so, the request is satisfied at step 544 via the local file data. If not in the local file, step 542 branches to step 546 where the read request is sent to the server. Note that as described above, if some of the requested data is in the local file, the read request sent to the server may be smaller than the read request received, with data returned from the server being combined with local data to properly satisfy the request.

At step 548, the returned data is evaluated to determine if it may be used to extend the sparse file. More particularly, if the local file is not completely filled, step 548 tests whether the current endpoint of the local file falls between the start point and the end point of the read request. If so, step 548 branches to step 550 to extend the local file. Step 552 then returns the data, and, as represented by the dashed lines, the data reading process either conceptually returns to the background thread process 83 or conceptually returns to step 540 to await further reads.

Figure 8:
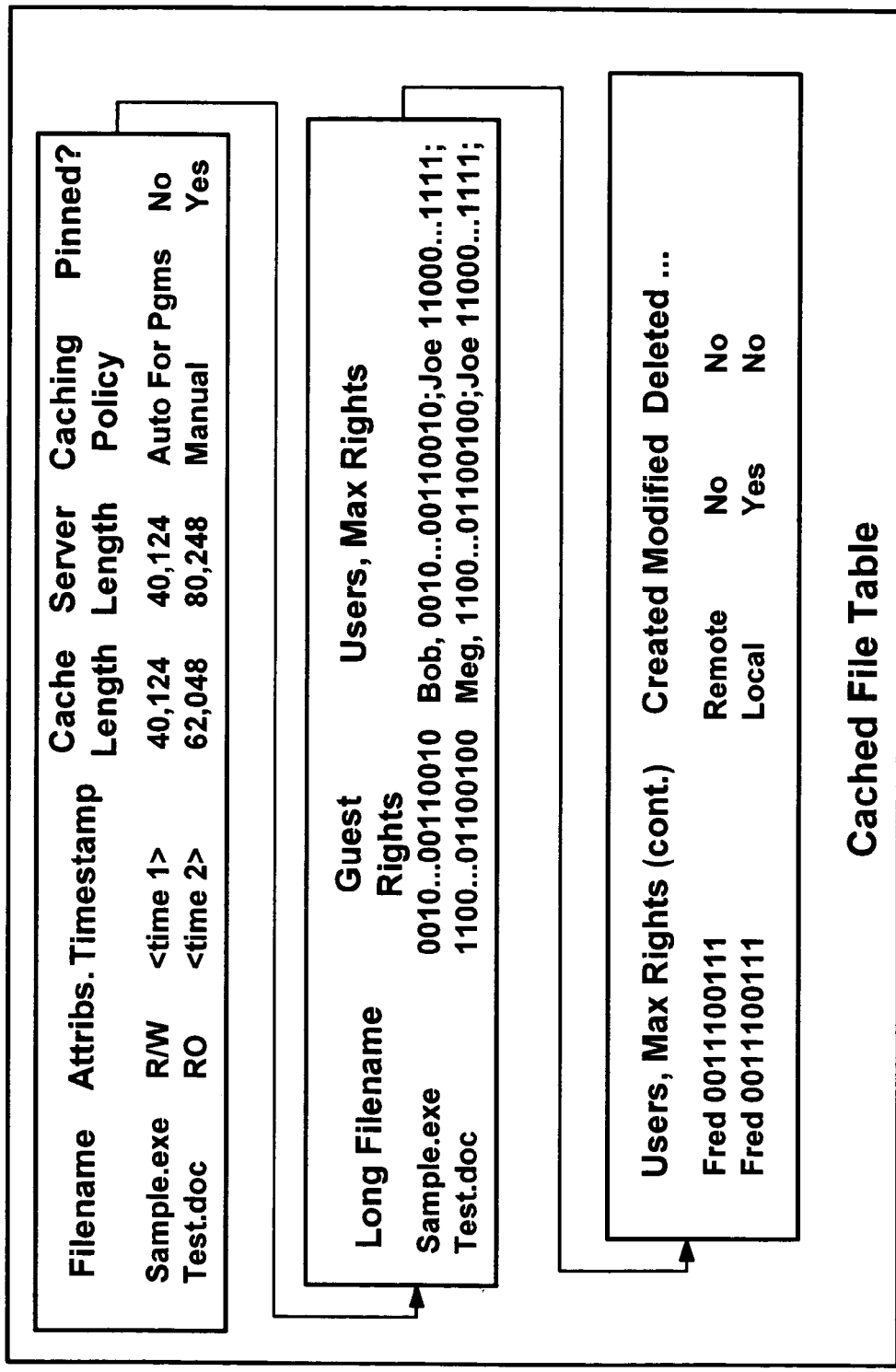

Turning now to an explanation of security, when a file is opened on the server and the server returns the file handle, the server also returns a resultant bitmask of maximum access rights for the user, along with a bitmask of guest rights and other metadata information including the file timestamp and the caching policy. The bitmask sets forth the access rights that the user has to that file, such as read access, write access and so. In accordance with another aspect of the present invention, the maximum access rights are maintained in association with a cached file for each user that accesses the file via the local machine 20, (i.e., the machine having the cache 82 stored thereon). Since when offline the server may not be contacted to determine a user's rights, a user gets his or her last stored rights to the file when attempting to access the file offline. To this end, the cached file table 84 includes security information in a record associated with each file, as represented in FIG. 8. Note that the last access rights granted for a user are maintained until that user next logs on. If a user who does not have rights stored with the file attempts to access the file, the user gets the guest rights, which may deny access.

FIG. 8 also illustrates the other information maintained in association with cached files, preferably stored in respective records in the cached file table 84. Although not shown in FIG. 8, the various tables are interconnected by association information, e.g., the superroot table 78 has information associating the UNC entries with the path information in the directory structures 80, which in turn are associated with information needed to locate the files thereunder. Along with the filename, the cached file table 84 maintains any file attributes (read only, read write, archive) and the timestamp as described above. Note that the timestamp is that of the counterpart server file, not the time the file was created in the cache.

The cached file table 84 also includes the length of the file in the cache and the length of the file in the server. This is used by the background thread 83 to check for sparse files, i.e., when the file lengths are the same, the file is complete and may be displayed and otherwise accessed by the user while working offline, otherwise the file is sparse and still needs to be filled. Sparse files are hidden from the user while the user is working offline. The record for each file also includes the caching policy, described above, and an indicator bit as to whether the file is pinned, so that the quota mechanism operates correctly.

There is a possibility that a document having a long filename (i.e., with more characters and/or variety thereof than the well-known eight character filename with a three character extension) will be edited offline by a program that can only function with a converted short filename. The long filename is stored in association with the file so that any changes made offline that result in the short filename being used may be converted back to the long file name for synchronization with the correct server file.

Moreover, in order to synchronize offline changes, rather than taking the brute force approach of logging every relevant file operation, additional information is maintained in association with the file. Such information includes whether the file was created offline, whereby it will need to be written to the server when the client next logs onto the server. Similarly, deleted status needs to be maintained, as does modified status. Note that renaming is a combination of a delete and a create operation.

Although not necessary to the invention, for each file having such a status change thereto, the appropriate superroot entry in the table 78 that is above that file is marked as changed, i.e., "dirty." This optimization eliminates having to walk through the UNC paths that have no files with status changes thereunder. Upon the next logon, the file status information for each changed file is then processed. For each file created offline, a new file is created on the server, and for each file deleted offline, the corresponding file on the server is deleted (possibly following a warning prompt). Files marked as modified files are not combined, but rather provide the user with choices comprising keep the offline copy, keep the server copy or save the offline copy under a new name. The new name is chosen by the system as the original filename followed by the username and a version number attached thereto.

As can be seen from the foregoing detailed description, there is provided a method and system for client-side caching that is straightforward and efficient. The system and method provide security, along with numerous other improvements, enhancements and optimizations to client-side caching.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computing environment, a method, comprising;
   maintaining a file cache at a local computing device;
   receiving, at a redirector of the local computing device, a file system-directed write request from a program to write data to a server file;
   evaluating an online or offline state of the local computing device and a property set of the server file that is accessible to the local computing device to determine whether to write data to the cache, to the server file, or to both the cache and the server file, wherein the property set associated with the server file indicates that caching is to be manually decided by the user; and satisfying the write request by writing data to the cache, to the server file, or to both the cache and the server file based on the online or offline state and property set evaluation, including determining from user instructions whether the file can be cached, and if so, writing data to the cache.

2. The method of claim 1 wherein the property set associated with the server file indicates that no caching is to be performed for the server file, and wherein satisfying the write request comprises writing data to the to the server file.

3. The method of claim 1 wherein the state is offline and the property set associated with the server file indicates that caching is allowed, and wherein satisfying the write request comprises writing data to the cache.

4. The method of claim 1 further comprising, receiving security information corresponding to the server file at the computing device, and maintaining the security data in association with a cached copy of the server file.

5. The method of claim 1 further comprising, maintaining a setting on the local computing device that indicates that a cached copy of the server file should not be removed from the cache based on a cache quota.

6. A computer-readable medium having computer-executable instructions, which when executed, perform the method of claim 1.

7. A computer-readable medium having computer-executable instructions, which when executed perform steps, comprising:

receiving a file system read request to read a range of data from a network server file, the range capable of starting at an arbitrary offset within the file data;

in response to the read request, accessing a local file that corresponds to the server file and determining whether any data within the range of data requested from the server file is missing in the local file with respect to the read request, wherein the local file is sparse;

if any data in the local file is missing with respect to the read request, accessing the network server file to obtain at least one set of missing data to return the requested range of data in its entirety in response to the read request; and filling at least part of the local file with data from the server file, including filling at least part of the local file via a background process, wherein the background process determines that the local file is already open, obtains a file handle of the open file, and issues a read request via the file handle of the open file.

* * * * *